Figure 1:
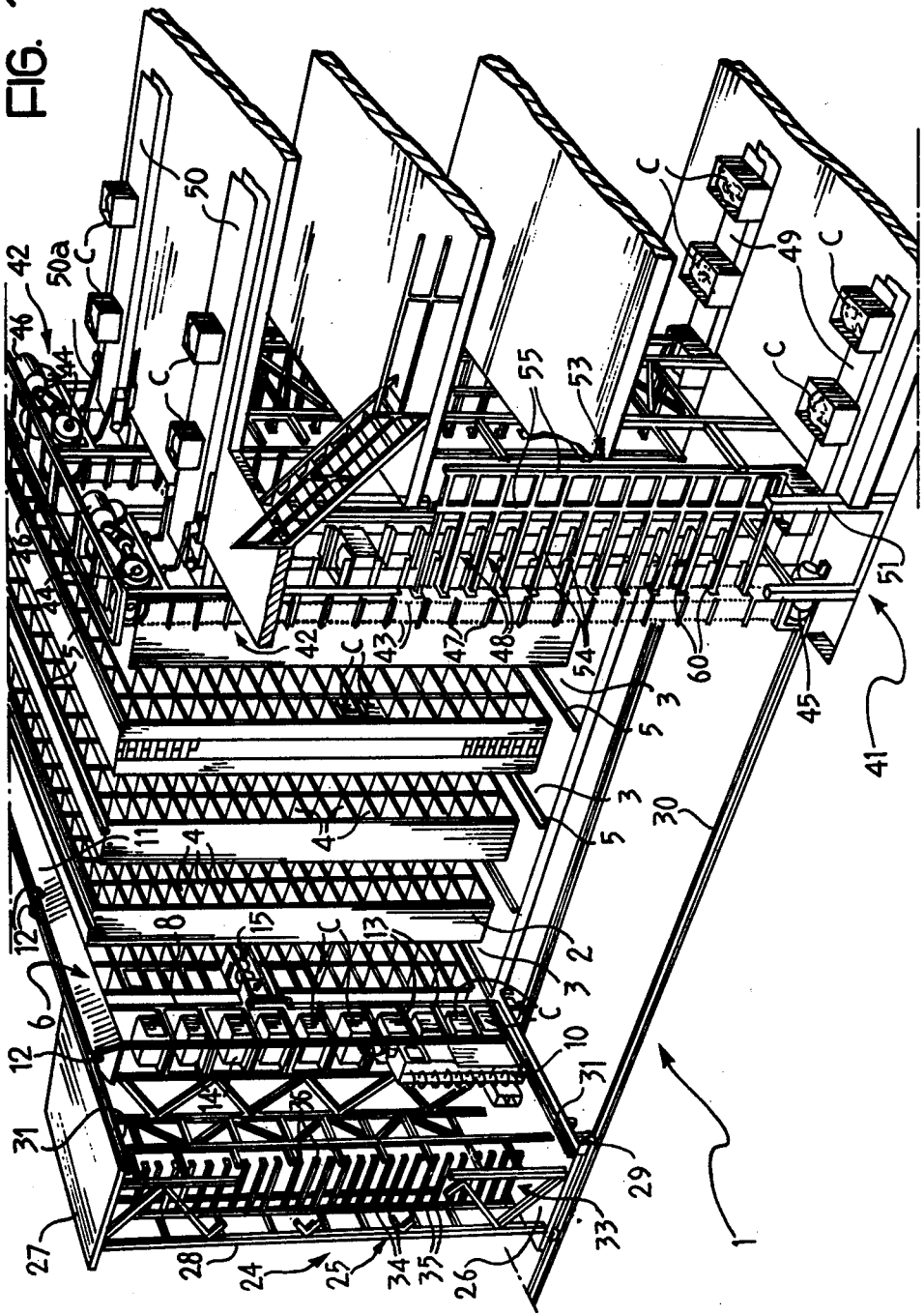

United States Patent [19]

Mautino

[11] Patent Number: 4,466,765
[45] Date of Patent: Aug. 21, 1984

[54] MECHANIZED STORE

[75] Inventor: Sergio Mautino, Turin, Italy

[73] Assignee: Comau S.p.A., Grugliasco, Italy

[21] Appl. No.: 365,926

[22] Filed: Apr. 5, 1982

[30] Foreign Application Priority Data

Apr. 13, 1981 [IT] Italy ................................ 67504 A/81

[51] Int. Cl.³ .............................................. B65G 1/04
[52] U.S. Cl. .................................... 414/277; 414/284;
414/331; 414/542
[58] Field of Search ............................... 414/277–284,
414/331, 542

[56] References Cited

U.S. PATENT DOCUMENTS 3,719,288  3/1973  Schmitt et al. .................. 414/281 X

FOREIGN PATENT DOCUMENTS 2063839  6/1981  United Kingdom ................ 414/282

Primary Examiner—Robert G. Sheridan
Attorney, Agent, or Firm—Sughrue, Mion, Zinn, Macpeak, and Seas

[57] ABSTRACT

A mechanized store includes a plurality of cells for storing containers, disposed side by side in horizontal and vertical rows along at least one passage and open on their sides facing the passage, a transporter-elevator device including a first support structure movable horizontally along the passage, a second support structure movable vertically on the first support structure, and a moving device carried by the second support structure and arranged to insert articles into, or take up articles from, the storage cells. A transfer station for articles which is located outside the passage and can be accessed by the transporter-elevator device to allow the loading onto the latter of each article intended to be placed in a corresponding storage cell, and the discharge from the transporter-elevator device of each article intended to be sent to the exit of the store. A transfer device is provided for simultaneously transferring a plurality of articles from the transporter-elevator device to the transfer station and vice versa.

10 Claims, 8 Drawing Figures

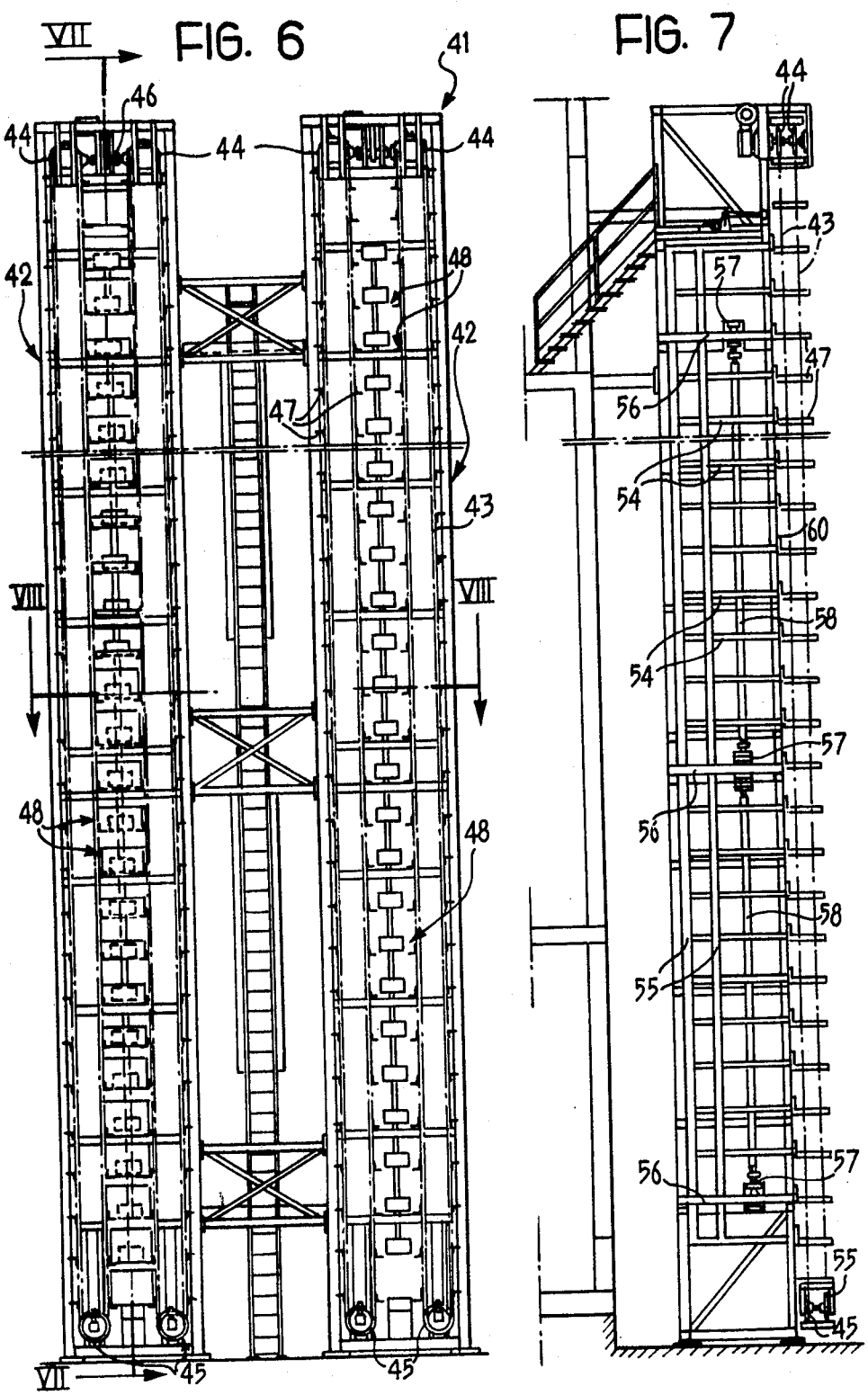

MECHANIZED STORE

The present invention relates to mechanized stores.

More particularly, the invention relates to a mechanized store of the type comprising:

a plurality of cells for storing articles, disposed side by side in horizontal and vertical rows along at least one passage and open on their sides facing the passage, a transporter-elevator device, comprising a first support structure movable horizontally along the passage, a second support structure movable vertically on the first support structure, and movement means carried by the second support structure and arranged to insert and take up articles respectively into and from, the storage cells, a transfer station for the articles, located outside the passage and capable of being accessed by the transporter-elevator device to allow the loading onto the latter of each article intended to be inserted in a corresponding storage cell, and the discharge from the transporter-elevator device of each article intended to be sent to the exit of the store.

Mechanized stores of the type indicated above have been used for some time to facilitate and render more accurate and rapid the selection and distribution of stored articles. In mechanized stores of this type, when an article to be stored arrives at the transfer station, the transporter-elevator device is brought to this station, takes up the article to be stored, is brought back into the passage and deposits the article in an empty cell. The subsequent movement of the transporter-elevator device towards the transfer station is used for transporting an article to be sent to the exit of the store. The said operations are controlled by an operator, or by a computer programmed for this purpose. Naturally, the store usually includes several passages and various transporter-elevator devices, just as it may also include more than one transfer station.

The object of the present invention is to provide a mechanized store of the type indicated above which allows the operations of storage and of selection and distribution of the stored articles to be carried out more rapidly.

The main characteristic of the mechanized store according to the invention lies in the fact that the transporter-elevator device is provided with a series of auxiliary compartments, carried by the said first support structure, for the simultaneous transport of a plurality of articles, in that the said mechanized store further includes transfer means for simultaneously transferring a plurality of articles from the auxiliary compartments of the transporter elevator device to the transfer station and vice versa, and in that the said movement means with which the transporter-elevator device is provided are arranged to transfer articles from the auxiliary compartments to the storage compartments and vice versa.

By virtue of the said characteristic, the transporter-elevator device can take up a plurality of articles to be stored simultaneously from the transfer station. After this take up, the transporter-elevator device is moved into a passage of the store to deposit the articles to be stored in empty cells. The present device differs from known devices in that, after the deposit of an article in a corresponding storage cell, the known devices must return to the transfer station to take up the next article to be stored, whereas the transporter-elevator device forming part of the mechanized store according to the present invention need only return to the transfer station when the "supply" of articles for storage transported thereby has been exhausted. Similarly when it is necessary to send a series of articles to the exit of the store, the transporter-elevator device forming part of the mechanized store according to the present invention enables a series of articles intended to be removed from the store to be deposited by means of the said movement means in the auxiliary compartments of the device during a first time period. The transporter-elevator device then moves to the transfer station where it can transfer series of articles transported thereby simultaneously.

According to a further preferred characteristic of the present invention, the first support structure of the transporter-elevator device carries a first and a second series of auxiliary compartments. Moreover, the said transfer means are capable of simultaneously transferring a first series of articles from the first series of auxiliary compartments to the transfer station and a second series of articles from the transfer station to the second series of auxiliary compartments.

By virtue of the said characteristic, the transporter-elevator device is able, each time it is at the transfer station, to transfer simultaneously to the station a series of articles intended to be sent to the exit of the store, and, at the same time, is able to receive from the transfer station a series of articles to be stored.

In a preferred embodiment of the mechanized store according to the present invention, the auxiliary compartments of each series are located on top of each other and in number equal the number of horizontal rows of storage cells.

In this preferred embodiment, moreover, the two series of auxiliary compartments of the transporter-elevator device are carried by two tower structures between which the said second support structure is slidable vertically. The movement means carried by the second support structure comprise a pair of orientatable gripper devices carried on two carriages movable on the second support structure and intended to transfer articles between the storage cells and the auxiliary compartments of the first series and between the storage cells and the auxiliary compartments of the second series respectively.

In this preferred embodiment, therefore, when the transporter elevator device is at the transfer station, it is able to "empty" one of the two tower structures of articles carried thereby which are to be sent to the exit of the store and, at the same time, is able to fill the other tower structure with articles for storage. When the transporter-elevator device is moved into a passage, it therefore has one of the two tower structures "full" with articles to be stored and the other tower structure completely "empty". The two gripper devices with which the second support structure of the transporter-elevator device is provided, are at this point, able to transfer the articles intended to be sent to the exit of the store from the storage cells to the auxiliary compartments of the "empty" tower structure and, at the same time, to transfer the articles to be stored from the "full" tower structure to the same number of empty storage cells. The said operations may clearly be carried out even in the case in which, hypothetically, all the storage cells of the store were initially full, which is a further advantage over the corresponding systems of known type.

Figure 2:
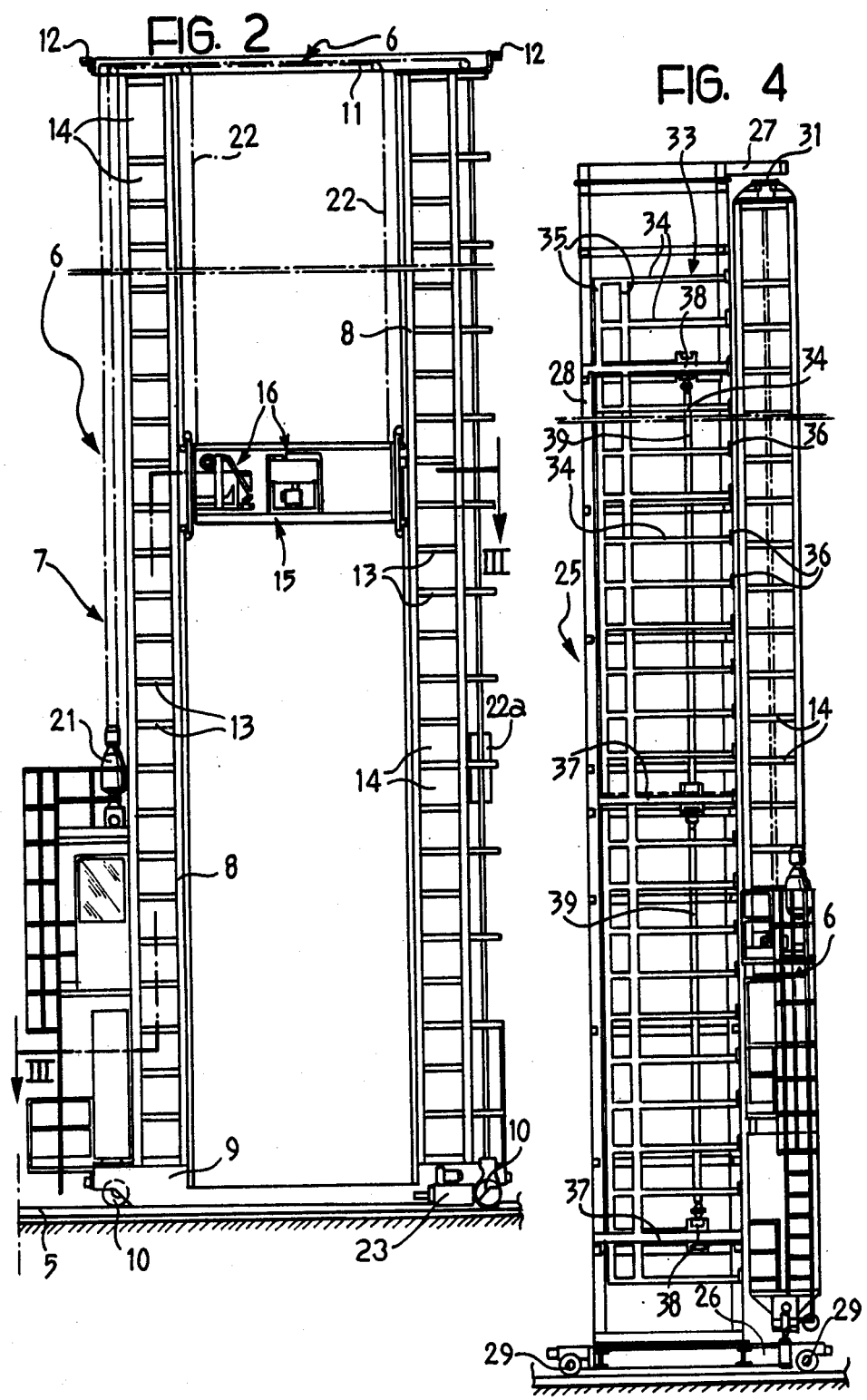
Figure 3:
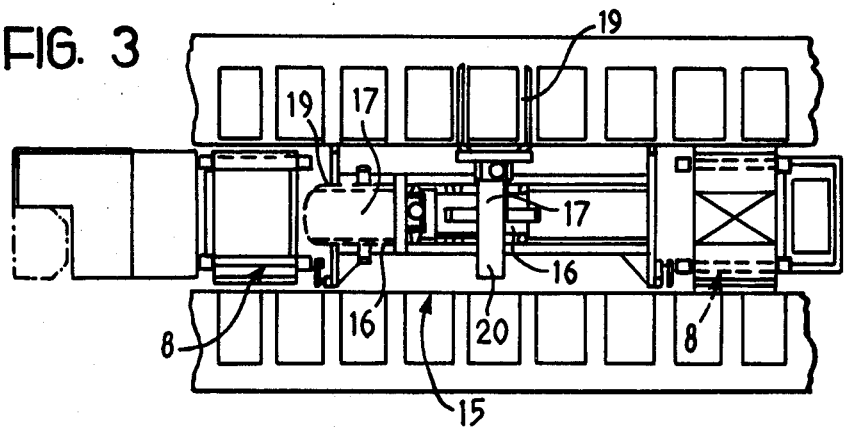
Figure 5:
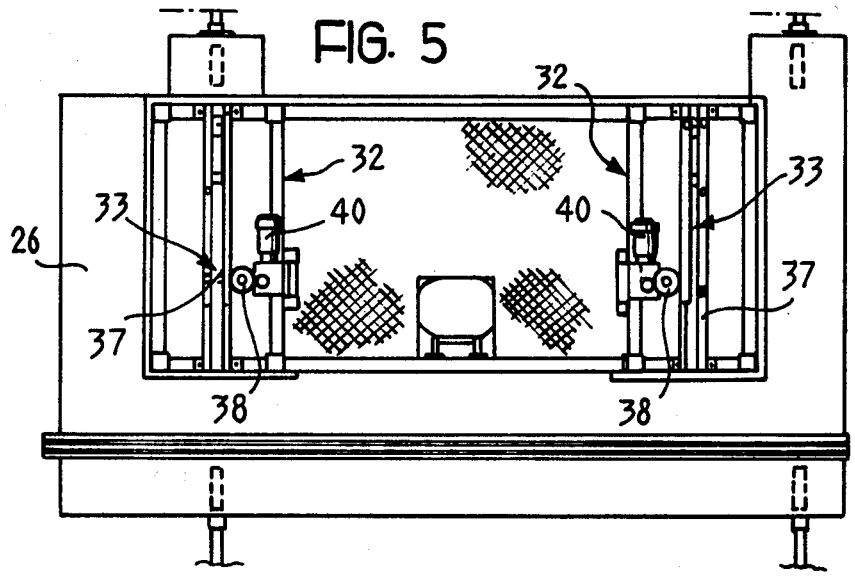
Figure 8:
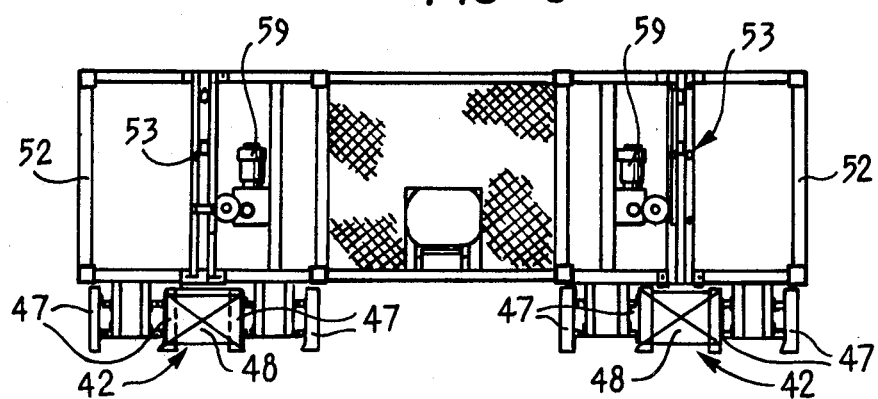

Further characteristics and advantages of the present invention will emerge from the description which follows with reference to the appended drawings, provided purely by way of non-limiting example, in which:

FIG. 1 is a schematic perspective view of a mechanized store according to a preferred embodiment of the present invention, FIG. 2 is an elevational view of a transporter-elevator device forming part of the store of FIG. 1, FIG. 3 is a section taken on line III—III of FIG. 2, FIG. 4 is a side elevational view of a transfer device forming part of the store of FIG. 1 with the transporter elevator device thereon, FIG. 5 is a top view of the transfer device shown in FIG. 4, without the upper platform and transporter elevator device FIG. 6 is an elevational view of a transfer station forming part of the store in FIG. 1, FIG. 7 is a section taken on line VII—VII of FIG. 6, and FIG. 8 is a section taken on line VIII—VIII of FIG. 6.

In FIG. 1 a mechanized store is generally indicated 1 and comprises a plurality of banks of shelves 2, divided from each other by passage 3 and each extending in height from the floor to the ceiling of the store. Each bank of shelves 2 comprises a plurality of storage cells 4 disposed side by side in horizontal and vertical rows and each open on its side facing the adjacent passage. In the example illustrated, each bank of shelves 2, except the banks of shelves at the ends of the store, is located between two passages 3 and comprises two series of cells facing the two adjacent passages 3 respectively.

In correspondence with each passage 3 the floor and ceiling of the store are provided with rails 5 for guiding a transporter-elevator device 6. Although FIG. 1 illustrates only one transporter-elevator device, the mechanized store is in practice provided with a plurality of devices of this type.

The transporter-elevator device 6 comprises a first support structure 7 (see FIG. 2) able to move horizontally on the guide rails 5 of each passage 3.

With reference to FIG. 2, the first support structure 7 includes two tower structures 8 carried at their lower ends on a carriage 9 including a pair of rollers 10 arranged to engage the lower rail 5 of a passage 3. The two tower structures 8 are connected at their upper ends by a transverse structure 11 including two pairs of vertical-axis rollers 12 arranged to engage the sides of the upper rail 5 of the passage 3 (see also FIG. 1). Each tower structure 8 comprises a series of shelves 13 arranged one above the other and defining a series of superimposed auxiliary compartments 14 the number of which is the same as the number of shelves in each shelf bank 2. The transporter-elevator device is thus provided with a first and a second series of auxiliary compartments 14 in correspondence with the two tower structures 8. Between these latter a second support structure 15, constituted by a platform, is vertically slidable. On this platform two carriages 16 (see FIG. 3) each carrying a gripper device 19, are slidable in a horizontal direction parallel to the rails 5. The body of the gripper device 19 is supported for horizontally sliding movement on a support member 20 which is mounted for rotation about a vertical axis 17 on the corresponding carriage 16. The vertical movement of the platform 15 relative to the two tower structures 8 is effected by a drive unit 21 through a pair of chain transmissions 22 to which a counterweight 22a is connected. The movement of the transporter-elevator device along the rails 5 is on the other hand, effected by a drive unit 23 disposed on the lower carriage 9. The movements of the transporter-elevator device may be controlled by an operator or by a computer programmed for this purpose.

In FIG. 1, a transfer device is generally indicated 24 and comprises a support structure 25 movable horizontally outside the passage 3 in a direction perpendicular to such passage. The support structure 25 includes (see also FIGS. 4, 5) a lower platform 26 and an upper platform 27 joined together by a framework 28. The lower platform 26 is provided with a carriage including two pairs of rollers 29 guided on the rails 30 of the floor of the store. The lower platform 26 and the upper platform 27 are each provided with a rail 31 engageable by the lower and upper rollers of the transporter-elevator device 6 (see FIG. 4). The transfer device 24 is thus able to move on the guide rails 30 up to the exit from a passage 3 and to receive and support on the platform 26 a transporter-elevator device 6 leaving the passage. FIG. 1 shows a transporter-elevator device 6 leaving the passage 3 in the process of embarking onto the transfer device 24. The transporter-elevator device 6 is also illustrated in FIG. 4 in the condition of engagement with the rails 31 of the transfer device 24.

As illustrated in FIG. 5, the framework 28 of the transfer device 24 includes two towers 32 in each of which a structure 33 is horizontally slidable. Each structure 33 includes a series of horizontal bars 34 arranged one above the other and joined together by two vertical columns 35 (see FIG. 4). The horizontal bars 34 are pusher bars the function of which will be clarified below. There are the same number of bars 34 as auxiliary compartments 14 of each tower structure 8 of the transporter-elevator device 6. As stated above, there are, in their turn, the same number of auxiliary compartments 14 in each tower structure 8 as there are shelves in each bank of shelves 2.

The free end of each horizontal bar 34 is provided with a vertical pusher plate 36. Each structure 33 is further provided (see FIG. 4) with three rack elements 37 which are engaged by respective gears 38. The gears 38 are connected together by means of two shafts 39 (see FIG. 4) and are driven by a motor 40 (see FIG. 5).

In FIG. 1, by reference numeral 41 is generally indicated a transfer station forming part of the mechanized store. Although only a single transfer station is illustrated in the drawings, in practice the store includes a pair of such stations disposed at the ends of the passage provided with the rails 30. Furthermore, preferably the store includes two transfer devices mounted on the rails 30 and arranged to serve the two transfer stations 41 in the manner which will be described below.

The transfer station 41 comprises a fixed structure including a pair of towers 42 (see FIG. 6). Each tower 42 is provided on its side facing the rails 30 with two pairs of endless chains 43 engaged around toothed wheels 44 (also see FIG. 7) and 45 disposed at the top and at the bottom of each tower 42 respectively. Each chain 43 has its vertical passes lying in a vertical plane perpendicular to the direction of the rails 30. The toothed wheels 44 are rotated by a drive unit 46 disposed at the top of each tower 42. Each pair of chains 43 supports a series of forks 47 arranged at equal intervals. The forks 47 supported by the adjacent sections of the chains 43 define a series of supports 48 disposed one above the other and the same in number as the number of shelves in the shelf banks 2.

The storage cells 4 of the shelf banks 2 are arranged to receive containers each intended for the storage of goods of a predetermined type.

As will become clear from the following description, the two towers 42 are intended to act as collecting towers for containers to be stored and for containers to be sent to the exit of the store. These containers are indicated by C in FIG. 1.

The transfer station 41 includes two belt conveyor devices 49 disposed at the bottom of the station for supplying containers C to the collecting towers 42, and two belt conveyor devices 50 disposed at the top of the station for conveying containers C from the collecting towers 42 to the exit of the store.

The transfer station 41 further includes a framework 51 similar to the framework 28 of the transfer device 24. The framework 51 also comprises two towers 52 (see also FIG. 8) each of which supports, for sliding movement in a horizontal direction, a structure 53 similar to each of the structures 33 of the transfer device 24. Each of the structures 53 in fact is constituted by a series of horizontal pusher bars 54 located one above another and joined by two vertical columns 55. In this case also, three rack elements 56 are provided each structure being coupled to three gears 57 (see FIG. 7) which are connected together by two shafts 58 and are driven by a motor unit 59 (see FIG. 8). Also in this case, each horizontal pusher bar 54 is further provided at its free end with a vertical plate 60 (see FIG. 6).

The operation of the mechanized store described above is as follows:

Supposing that one of the two collecting towers 42 of the transfer station 41 is full of containers C destined to be stored in corresponding cells 4 of the bank of shelves 2. This means that all the supports 48 of the said collecting tower 42 carry a container C. This condition may be achieved by supplying containers C successively to the collecting tower by means of the corresponding lower belt conveyor 49. Naturally, the conveyor belt 49 will periodically supply a container C to the support 48 which is at the bottom of the vertical array of supports 48 of the collecting tower 42. Each time a container C is transferred from the belt conveyor 49 to the said support 48, the chains 43 are driven so as to displace the said support 48 upwardly and bring a new support into a position ready to receive the next container C, that is, into the position previously occupied by the support which has just received a container C. By proceeding in this manner, the entire collecting tower 42 may be "filled" with containers C to be stored.

Supposing, by way of example, that the transporter-elevator device 6 has left a passage 3 and has been received by the transfer device 24. In this condition, the two tower structures 8 of the transporter-elevator device 6 are disposed in correspondence with the two rails 30 and face the two collecting towers 42 of the transfer station 41.

Supposing moreover, still by way of example, that the tower structure 8 facing the collecting tower 42 which is "full" of containers C to be stored, is "empty" while the other tower structure 8 is "full" of containers C requiring to be sent to the exit of the store.

The transfer device 24, once it has received the transporter-elevator device 6, moves along the rail 30 until it is adjacent the transfer station 41. Under these conditions, the collecting tower 42 which is "full" of containers C to be stored faces an "empty" tower structure 8 while the tower structure 8 of the transporter-elevator device 6 which is "full" of containers C to be sent to the exit of the store faces a collecting tower 42 which is "empty".

Moreover, each support 48 of the collecting towers 42 faces and is at the same height as a corresponding shelf 13 of the tower structures 8.

At this point, the pusher arms 54 associated with the collecting tower 42 which is "full" and the pusher arms 34 associated with the tower structure 8 which is "full" are actuated simultaneously. As a result the containers C to be stored are simultaneously transferred from the collecting tower 42 to the tower structure 8 of the transporter-elevator device. Each container C leaves its support 48 in the collecting tower 42, due to the thrust of the plate 60, and is received in a corresponding auxiliary compartment 14 of the tower structure 8 of the transporter-elevator device. At the same time, the containers C to be sent to the exit of the store, leave the auxiliary compartments 14 of the tower structure 8 due to the thrust of the plates 36, and are received on the supports 48 of the corresponding collecting tower 42.

In conclusion, by virtue of the said operation, the transporter elevator device 6 transfers simultaneously into the station 41 the containers C conveyed thereby and intended to be sent to the exit of the store, while at the same time the station 41 transfers simultaneously the containers C to be stored, into the transporter-elevator device 6.

When this operation is finished, the collecting tower 42 which has been filled with containers C is "emptied" of these containers by means of the corresponding upper belt conveyor 50 and the grippers 50a with which its upper part is provided. These grippers serve to transfer onto the conveyor 50 the container C carried by the support 48 at the top of the tower 42. Naturally, in this phase, the chains 43 of the tower 42 are driven intermittently to carry the various containers C successively into the top position where the grippers 50a take up each container and deposit it on the conveyor 50. The containers C are thus conveyed towards the exit of the store by means of the belt conveyor 50.

At the same time, when the said operation of "exchanging" containers between the transfer station 41 and the transporter-elevator device has finished, one of the two tower structures 8 of this latter is completely "empty" while the other tower structure 8 is "full" of containers C destined for storage in an equal number of storage compartments 4.

To enable this storage to take place the transfer device 24 moves along the rails 30 to bring the transporter-elevator device 6 into correspondence with the desired passage 3. When this translational movement of the transfer device 24 is completed, the transporter-elevator device 6 moves in a direction parallel to the passage, thus leaving the transfer device 24 and engaging the rails 5 with which the passage is provided.

Horizontal movement of the carriage 9 and vertical movement of the platform 15 of the transporter-elevator device 6 allow the gripper devices 19 (see FIG. 3) carried by the platform 15 to access any storage cell facing the passage.

Once the platform 15 has been positioned such that its central zone corresponds with a desired cell 4, the carriage 16 associated with the tower structure 8 which is "empty" is brought to the centre of the platform 15, as illustrated in FIG. 3. The gripper device 19 with which this carriage is provided is then rotated and advanced to the position illustrated in FIG. 3 in which it can grasp a container C located in the chosen cell and which is to be conveyed to the exit of the store. The body of the gripper device 19 is then caused to slide on the support member 20 so as to leave the cell 4, after which the support member 20 is rotated about its vertical axis 17 so as to turn the gripper device 19 towards the corresponding tower structure 8. The carriage 16 is advanced towards this tower structure so as to allow the gripper device to deposit the container C which has been taken from the storage cell, into an auxiliary compartment 14 of the "empty" tower structure 8.

Meantime the platform 15, by means of its vertical displacement and possible horizontal displacement of the carriage 9, moves into correspondence with the empty cell intended to receive one of the containers C to be stored and conveyed by the tower structure 8 which is "full" of these containers. At this point, the carriage 16 associated with this tower structure, executes a sequence of steps similar to those described above but in reverse order, whereby to take up one of the containers C to be stored from the corresponding auxiliary compartment 14 of the tower structure 8 and deposit it in the storage cell which is ready to receive it.

The said operations are repeated by each gripper device 19 a number of times equal to the number of shelves of each shelf bank 2. At the end of this sequence of operations, all the containers C to be stored which were initially carried by one of the two tower structures 8 of the transporter-elevator device 6 have been transferred into a corresponding number of storage cells 4, while the auxiliary compartment 14 of the tower structure 8 which had initially been "empty" are filled with a corresponding number of containers C intended to be sent to the exit of the store. At the end of these operations, therefore, the transporter-elevator device 6 again has a "full" tower structure 8, the other tower structure 8 being "empty".

At this point, the transporter-elevator device 6 again leaves the passage 3 and is received by the transfer device 24 which carries it to the station 41 where an exchange of containers C similar to that described above is again effected. More particularly, the pusher arms 34 associated with the tower structure 8 which is "full" of containers C to be sent to the exit of the store, transfer these containers onto the collecting tower 42 which is "empty" while, at the same time, the pusher arms 54 which are associated with the collecting tower 42 which is full of containers C to be stored, transfers these containers onto the tower structure 8 which is "empty".

In order to carry out the operation described above, in theory it would suffice to provide a single series of pusher arms 34 on the transfer device 24 and a single series of pusher arms 54 at the transfer station 41. In the practical example illustrated, however, in order to achieve a greater flexibility of operation, the transfer device 24 is provided with two series of pusher arms 34, while both the collecting towers 42 of the transfer station 41 are provided with a series of pusher arms 54. For the same reason, both the collecting towers 42 are provided with a lower conveyor 49 and an upper conveyor 50. In this manner one of the two collecting towers 42 may be used to receive the containers which are leaving the store and the other the containers which are entering the store, or vice versa, or both may be used to receive containers which are leaving or both to receive containers which are entering.

From the foregoing description, it is clear that the mechanized store according to the present invention allows the operations necessary for the storage of containers, and also the operations for taking them up and conveying the containers to the exit of the store, to be rendered considerably more rapid and systematic.

Naturally, the principle of the invention remaining the same, the details of construction and the embodiments may be varied widely with respect to that described and illustrated purely by way of example, without thereby departing from the scope of the present invention.

I claim:

1. In a mechanized store comprising:
   a plurality of article-storage cells arranged side by side in horizontal and vertical rows along at least one passage and open on their sides facing the said passage,
   a transporter-elevator device comprising a first support structure movable horizontally along said passage, a second support structure movable vertically on the first support structure, and movement means carried by the second support structure and arranged to insert articles into, and remove articles from said storage cells, and
   an article-transfer station capable of being accessed by the said transporter-elevator device to allow the loading onto the latter of each article to be inserted in a corresponding said storage cell, and the removal from said transporter-elevator device of each article to be conveyed to the exit of the store; the improvement comprising
   said transporter-elevator device having a series of auxiliary compartments carried by said first support structure, for the simultaneous transport of a plurality of articles,
   transfer means for simultaneously transferring a plurality of articles from said auxiliary compartments of the transporter-elevator device to said transfer station and vice versa,
   said movement means of the transporter-elevator device being arranged to transfer articles from the said auxiliary compartments to the said storage cells and vice versa, said first support structure of the transporter-elevator device carrying a first series and a second series of auxiliary compartments, and said transfer means being arranged to simultaneously transfer a first series of articles from said first series of auxiliary compartments to the transfer station, and a second series of articles from the transfer station to the said second series of auxiliary compartments.

2. A mechanized store according to claim 1, wherein the auxiliary compartments of each said series are located one above another.

3. A mechanized store according to claim 2, wherein the number of auxiliary compartments in each series is equal to the number of horizontal rows of storage cells.

4. A mechanized store according to claim 2, wherein the first support structure of said transporter-elevator device includes a pair of tower structures each of which carries a said series of auxiliary compartments located one above another, and between which the said second support structure is slidable vertically.

5. A mechanized store according to claim 4, wherein the said movement means comprise two orientatable gripper devices carried on respective carriages movable on the said second support structure of the transporter-elevator device, one said gripper device and its associated carriage being arranged to transfer articles between the storage cells and the auxiliary compartments of the said first series and the other said gripper device and its associated carriage being arranged to transfer articles between the storage cells and the auxiliary compartments of the said second series.

6. A mechanized store according to claim 4, wherein there is further provided a transfer device comprising a support structure movable horizontally outside the said passage in a direction perpendicular thereto and arranged to receive and to support the said transporter-elevator device and to transport it from the passage exit to the said transfer station and vice versa.

7. A mechanized store according to claim 6, wherein rails are provided along the said passage and perpendicular thereto respectively for guiding horizontal movement of said transporter-elevator device and of said transfer device, the said support structure of the transfer device being also provided with rails for receiving and supporting the transporter-elevator device.

8. A mechanized store according to claim 6, wherein the said transfer station includes two article-collecting towers provided respectively with a first and a second series of supports located one above another and equal in number to the number of auxiliary compartments in each said series thereof, the said transfer means comprising:

first pusher means carried by said transfer device and operable, when the transporter-elevator device is supported by the said transfer device and the latter is adjacent the said transfer station, to push articles contained in at least one said series of auxiliary compartments of the transporter-elevator device simultaneously onto the said supports of the corresponding said collecting tower of the transfer station, and second pusher means disposed at the transfer station and operable, when the transporter-elevator device is adjacent the transfer station, to simultaneously push articles carried by said supports of at least one said collecting tower into corresponding auxiliary compartments of the transporter-elevator device.

9. A mechanized store according to claim 8, werein each said collecting tower of the transfer station is provided with:

an elevator device in which the said supports of that tower are mounted, and a lower belt conveyor and an upper belt conveyor for the loading and discharge of articles from the said supports of the collecting tower.

10. A mechanized store according to claim 8, wherein the said first pusher means and the said second pusher means each include a respective structure which is movable hoirzontally and provided with a vertical series of horizontal pusher bars equal in number to the number of the auxiliary compartments of each said series thereof.

* * * * *